United States Patent
Tanaka et al.

(10) Patent No.: US 6,403,719 B1
(45) Date of Patent: Jun. 11, 2002

(54) FLEXIBLE RESIN COMPOSITION AND USES THEREOF

(75) Inventors: Yasuo Tanaka; Naoto Yasaka, both of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/627,061

(22) Filed: Jul. 27, 2000

(30) Foreign Application Priority Data

Jul. 27, 1999 (JP) .......................................... 11-211877

(51) Int. Cl.⁷ ........................... C08L 23/00; C08L 23/04
(52) U.S. Cl. ...................................... 525/191; 525/240
(58) Field of Search .................................. 525/191, 240

(56) References Cited

U.S. PATENT DOCUMENTS 5,321,106 A    6/1994   LaPointe

FOREIGN PATENT DOCUMENTS

| EP | 320762  | 6/1989 |
| EP | 350170  | 1/1990 |
| EP | 0360492 | 3/1990 |
| JP | A1501950 | 7/1989 |
| JP | A1502036 | 7/1989 |
| JP | A2078687 | 3/1990 |
| JP | A2084404 | 3/1990 |
| JP | A2229807 | 9/1990 |
| JP | A3179005 | 5/1991 |
| JP | A3179006 | 5/1991 |
| JP | A3207703 | 5/1991 |
| JP | A3207704 | 5/1991 |

*Primary Examiner*—Nathan M. Nutter
(74) *Attorney, Agent, or Firm*—Birch, Stewart, Kolasch & Birch, LLP

(57) ABSTRACT

A polypropylene resin-containing flexible resin composition can provide molded products well-balanced among flexibility, heat resistance and compression set and having improved scratch resistance and transparency and which exhibits such high flowability as to cause excellent moldability, and a molded product thereof. The flexible resin composition of the invention is prepared in the presence of a metallocene catalyst and comprises an ethylene/α-olefin random copolymer (A) and a polypropylene resin (B) in a specific ratio. The flexible resin composition has excellent moldability, so that it can be favorably used as a resin composition for injection molding, extrusion molding and compression molding. The flexible resin molded product produced from the flexible resin composition is well balanced among flexibility, heat resistance and compression set and has excellent scratch resistance and transparency.

17 Claims, No Drawings

FLEXIBLE RESIN COMPOSITION AND USES THEREOF

FIELD OF THE INVENTION

The present invention relates to a flexible resin composition which can provide molded products well-balanced among flexibility, heat resistance and compression set and having improved scratch resistance and transparency and which exhibits such high flowability as to cause excellent moldability. The present invention also relates to uses of the flexible resin composition.

BACKGROUND OF THE INVENTION

Because of its excellent scratch resistance, transparency and heat resistance, a polypropylene resin is widely employed for films, sheets, tubes and packing. The polypropylene resin now employed are excellent in scratch resistance, transparency and heat resistance but are not satisfactory in flexibility and compression set (CS), so that various methods to improve these properties have been studied.

For example, blending of the polypropylene resin with various elastomers (e.g., an ethylene/propylene copolymer rubber and an ethylene/1-butene copolymer rubber) to impart flexibility to the resin has been proposed.

Blending of the polypropylene resin with the conventional ethylene elastomers, however, has a problem in that the heat resistance and compression set are markedly lowered though the flexibility is improved.

Accordingly, there has been heretofore desired development of a polypropylene resin composition which can provide molded products well-balanced among flexibility, heat resistance and compression set and having improved scratch resistance and transparency and which exhibits high flowability favorable for various molding.

OBJECT OF THE INVENTION

The present invention is intended to solve such a problem associated with prior art as described above, and it is an object of the invention to provide a polypropylene resin-containing flexible resin composition which can provide molded products well-balanced among flexibility, heat resistance and compression set (CS) and having improved scratch resistance and transparency and which exhibits such high flowability as to cause excellent moldability.

SUMMARY OF THE INVENTION

The flexible resin composition according to the invention is a composition comprising:

(A) 100 parts by weight of a long-chain branched ethylene/α-olefin random copolymer comprising ethylene and an α-olefin of 3 to 20 carbon atoms, and (B) 2 to 200 parts by weight of a polypropylene resin; the ethylene/α-olefin random copolymer (A) having:

(i) a density of not more than 0.900 g/cm³, (ii) an intrinsic viscosity (η) as measured in decalin at 135° C. of in the range of 0.3 to 3.0 dl/g, (iii) a glass transition temperature (Tg) of not higher than −50° C., (iv) a crystallinity as measured by X-ray diffractometry of less than 40%, (v) a molecular weight distribution (Mw/Mn) as determined by GPC of not more than 3.0, (vi) a B value as determined by the $^{13}$C-NMR spectrum and the following formula of in the range of 0.9 to 1.4, $$B=P_{OE}/(2P_O \cdot P_E)$$

wherein $P_E$ and $P_O$ are a molar fraction of an ethylene component and a molar fraction of an α-olefin component, respectively, contained in the ethylene/α-olefin random copolymer (A) and $P_{OE}$ is a proportion of the number of ethylene/α-olefin alternating sequences to the number of all dyad sequences, and (vii) a ratio (gη* value, (η)/(η)blank) of the intrinsic viscosity (η) that is measured as the property (ii) to the intrinsic viscosity (η)blank of a linear ethylene/propylene copolymer having a weight average molecular weight (measured by a light scattering method) identical with that of the copolymer (A) and having an ethylene content of 70% by mol of in the range of 0.2 to 0.95; and the polypropylene resin (B) having:

(i) an MFR (ASTM D 1238, 230° C., load: 2.16 kg) of in the range of 1 to 150 g/10 min, and (ii) an initial flexural modulus (ASTM D 790) of not more than 1500 MPa.

It is most preferable that the polypropylene resin (B) is contained in an amount of 2 to 65 parts by weight based on 100 parts by weight of the ethylene/α-olefin random copolymer (A).

The ethylene/α-olefin random copolymer (A) preferably is an ethylene/α-olefin random copolymer obtained by random copolymerizing ethylene and an α-olefin of 3 to 20 carbon atoms in the presence of a metallocene catalyst containing a metallocene compound represented by the following formula (I):

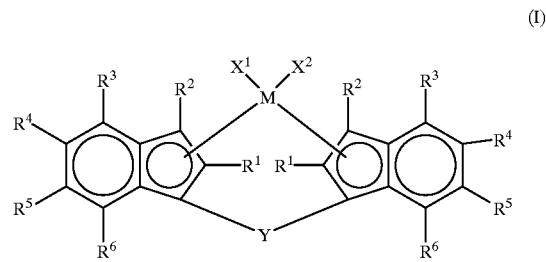

wherein M is a transition metal of Group IVB of the periodic table,

R¹ is a hydrocarbon group of 1 to 6 carbon atoms,

R², R⁴, R⁵ and R⁶ are the same or different and are each a hydrogen atom, a halogen atom or a hydrocarbon group of 1 to 6 carbon atoms, R³ is an aryl group of 6 to 16 carbon atoms, which may be substituted with a halogen atom, a hydrocarbon group of 1 to 20 carbon atoms or an organosilyl group, X¹ and X² are each a hydrogen atom, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO₂—, —NR⁷—, —P(R⁷)—, —P(O)(R⁷)—, —BR⁷— or —AlR⁷—

(where $R^7$ is a hydrogen atom, a halogen atom, a hydrocarbon group of 1 to 20 carbon atoms or a halogenated hydrocarbon group of 1 to 20 carbon atoms).

The injection molding resin composition, the extrusion molding resin composition and the compression molding resin composition according to the invention comprise the above-described flexible resin composition of the invention.

The flexible resin molded product according to the invention comprises the above-described flexible resin composition of the invention. This molded product may be a flexible resin sheet.

DETAILED DESCRIPTION OF THE INVENTION

The flexible resin composition according to the invention and uses thereof are described in detail hereinafter.

The flexible resin composition of the invention comprises a long-chain branched ethylene/α-olefin random copolymer (A) and a polypropylene resin (B) in a specific ratio.

Ethylene/α-olefin Random Copolymer (A)

The ethylene/α-olefin random copolymer (A) for use in the invention is a long-chain branched ethylene/α-olefin random copolymer comprising ethylene and an α-olefin of 3 to 20 carbon atoms.

Examples of the α-olefins of 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and mixtures thereof.

The ethylene/α-olefin random copolymer (A). for use in the invention has a density of not more than 0.900 g/cm$^3$, preferably not more than 0.895 g/cm$^3$, more preferably 0.840 to 0.890 g/cm$^3$.

The ethylene/α-olefin random copolymer (A) has an intrinsic viscosity (η), as measured in decalin at 135° C., of 0.3 to 3.0 dl/g, preferably 0.5 to 2.0 dl/g. The ethylene/α-olefin random copolymer (A) having an intrinsic viscosity in the above range has good blendability with the polypropylene resin (B). When this ethylene/α-olefin random copolymer (A) is used, a polypropylene resin-containing flexible resin composition having high flowability and excellent moldability can be obtained.

The ethylene/α-olefin random copolymer (A) has a glass transition temperature (Tg), as determined by DSC (differential scanning calorimeter), of not higher than −50° C., preferably not higher than −55° C., more preferably not higher than −57° C., particularly preferably −59° C. to −80° C.

The ethylene/α-olefin random copolymer (A) has a crystallinity, as measured by X-ray diffractometry, of less than 40%, preferably less than 30%, more preferably less than 20%, particularly preferably less than 10%. When the ethylene/α-olefin random copolymer (A) having a crystallinity of less than 40% is used, a polypropylene resin-containing flexible resin composition having excellent flexibility can be obtained.

The ethylene/α-olefin random copolymer (A) has a molecular weight distribution (Mw/Mn), as determined by GPC, of not more than 3.0, preferably not more than 2.7, more preferably not more than 2.5, particularly preferably not more than 2.3.

The ethylene/α-olefin random copolymer (A) has a parameter (B value) of 0.9 to 1.4, preferably 0.95 to 1.4, more preferably 1.0 to 1.4, said parameter indicating randomness of copolymerized monomer sequence distribution and being determined by a $^{13}$C-NMR method.

The B value of the ethylene/α-olefin random copolymer (A) is an indication of a composition distribution of constituent units derived from monomers in the copolymerization sequences, and can be calculated from the following formula:

$$B=P_{OE}/(2P_O \cdot P_E)$$

wherein $P_E$ and $P_O$ are a molar fraction of an ethylene component and a molar fraction of an α-olefin component, respectively, contained in the ethylene/α-olefin random copolymer (A) and $P_{OE}$ is a proportion of the number of ethylene/α-olefin alternating sequences to the number of all dyad sequences.

The $P_E$, $P_O$ and $P_{OE}$ values are specifically obtained in the following manner.

In a test tube having a diameter of 10 mm, about 200 mg of an ethylene/α-olefin random copolymer is homogeneously dissolved in 1 ml of hexachlorobutadiene to prepare a sample, and a $^{13}$C-NMR spectrum of the sample is measured under the following measuring conditions.

Measuring conditions

Measuring temperature: 120° C.

Measuring frequency: 20.05 MHz

Spectral width: 1500 Hz

Filter width: 1500 Hz

Pulse repetition time: 4.2 sec

Pulse width: 7 μsec

Number of integration times: 2000–5000

The $P_E$, $P_O$ and $P_{OE}$ values can be obtained from the thus measured $^{13}$C-NMR spectrum in accordance with the reports by G. J. Ray (Macromolecules, 10, 773 (1977)), J. C. Randall (Macromolecules, 15, 353 (1982)), K. Kimura (Polymer, 25, 4418 (1984)), et al.

The B value obtained from the above formula becomes 2 in case of an ethylene/α-olefin copolymer wherein both monomers are alternatingly distributed, and it becomes 0 in case of a complete block copolymer wherein those monomers are copolymerized completely separately from each other.

When the ethylene/α-olefin random copolymer (A) having a B value in the above range is used, a polypropylene resin-containing flexible resin composition capable of providing molded products having excellent flexibility and heat resistance can be obtained.

The ethylene/α-olefin random copolymer (A) for use in the invention has a gη* value of 0.2 to 0.95, preferably 0.4 to 0.9, more preferably 0.5 to 0.85.

The gη* value is defined as follows:

$$gη*=(η)/(η)\text{blank}$$

wherein (η) is an intrinsic viscosity measured as the aforesaid property (ii), and (η)blank is an intrinsic viscosity of a linear ethylene/propylene copolymer having a weight average molecular weight (measured by a light scattering method) identical with that of the copolymer (A) and having an ethylene content of 70% by mol.

That the gη* value of the ethylene/α-olefin random copolymer is not more than 0.95 means that a long-chain branch has been formed in the molecule.

When the gη* value is in the above range, a composition having excellent moldability and capable of providing molded products of low compression set and small heat deformation can be obtained.

Preparation of Ethylene/α-olefin Random Copolymer (A)

The long-chain branched ethylene/α-olefin random copolymer (A) having the above properties can be prepared by random copolymerizing ethylene and an α-olefin of 3 to 20 carbon atoms in the presence of a metallocene catalyst containing a specific metallocene compound.

There is no specific limitation on the metallocene catalyst used herein, except that the catalyst contains a metallocene compound (a). For example, the metallocene catalyst may be formed from the metallocene compound (a) and an organoaluminum oxy-compound (b) and/or a compound (c) which reacts with the metallocene compound (a) to form an ion pair, or may be formed from the metallocene compound (a), an organoaluminum oxy-compound (b) and/or a compound (c) which reacts with the metallocene compound (a) to form an ion pair, and an organoaluminum compound (d).

Metallocene Compound (a)

The metallocene compound (a) used for preparing the long-chain branched ethylene/α-olefin random copolymer (A) for use in the invention is, for example, a compound represented by the following formula (I).

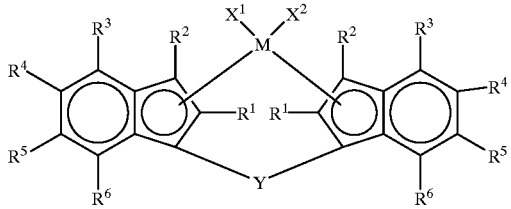

(I)

In the above formula, M is a transition metal atom of Group IVB of the periodic table, specifically titanium, zirconium or hafnium, particularly preferably zirconium.

Substituent $R^1$ $R^1$ is a hydrocarbon group of 1 to 6 carbon atoms, and examples thereof include alkyl groups, such as methyl, ethyl, n-propyl, isopropyl, n-butyl, isobutyl, sec-butyl, tert-butyl, n-pentyl, neopentyl, n-hexyl and cyclohexyl, and alkenyl groups, such as vinyl and propenyl. Of these, alkyl groups wherein the carbon bonded to the indenyl group is primary carbon are preferred, alkyl groups of 1 to 4 carbon atoms are more preferred, and methyl and ethyl are particularly preferred.

Substituents $R^2$, $R^4$, $R^5$, $R^6$ $R^2$, $R^4$, $R^5$ and $R^6$ are the same or different and are each a hydrogen atom, a halogen atom or the same hydrocarbon group of 1 to 6 carbon atoms as indicated by $R^1$.

The halogen atom is fluorine, chlorine, bromine or iodine.

Substituent $R^3$ $R^3$ is an aryl group of 6 to 16 carbon atoms, and this aryl group may be substituted with a halogen atom, a hydrocarbon group of 1 to 20 carbon atoms or an organosilyl group.

Examples of the aryl groups include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, phenyl, naphthyl, anthracenyl and phenanthryl are preferred.

Examples of the hydrocarbon groups of 1 to 20 carbon atoms as the substituents of the aryl groups include:

alkyl groups, such as methyl, ethyl, propyl, butyl, hexyl, cyclohexyl, octyl, nonyl, dodecyl, eicosyl, norbornyl and adamantyl, alkenyl groups, such as vinyl, propenyl and cyclohexenyl, arylalkyl groups, such as benzyl, phenylethyl and phenylpropyl, the aryl groups exemplified above, and other aryl groups, such as tolyl, dimethylphenyl, trimethylphenyl, ethylphenyl, propylphenyl, methylnaphthyl and benzylphenyl.

Examples of the organosilyl groups include trimethylsilyl, triethylsilyl and triphenylsilyl.

$X^1$ and $X^2$ $X^1$ and $X^2$ are each a hydrogen atom, a halogen atom, a hydrocarbon group of 1 to 20 carbon atoms which may be substituted with a halogen, an oxygen-containing group or a sulfur-containing group. Examples of the halogen atoms and the hydrocarbon groups are the same as described above.

Examples of the oxygen-containing groups include an hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

$X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$— (where $R^7$ is a hydrogen atom, a halogen atom, a hydrocarbon group of 1 to 20 carbon atoms or a halogenated hydrocarbon group of 1 to 20 carbon atoms).

For example, there can be specifically mentioned:

divalent hydrocarbon groups of 1 to 20 carbon atoms, e.g., alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene;

halogenated hydrocarbon groups wherein the above hydrocarbon groups of 1 to 20 carbon atoms are halogenated, such as chloromethylene;

divalent silicon-containing groups, e.g., alkylsilylene, alkylarylsilylene and arylsilylene groups, such as methylsilylene, dimethylsilylene, diethylsilylene, di(n-propyl)silylene, di(i-propyl)silylene, di(cyclohexyl)

silylene, methylphenylsilylene, diphenylsilylene, di(p-tolyl)silylene and di(p-chlorophenyl)silylene, and alkyldisilyl, alkylaryldisilyl and aryldisilyl groups, such as tetramethyl-1,2-disilyl and tetraphenyl-1,2-disilyl; and divalent germanium-containing groups wherein silicon is replaced with germanium in the above divalent silicon-containing groups.

$R^7$ is the same halogen atom, hydrocarbon group of 1 to 20 carbon atoms or halogenated hydrocarbon group of 1 to 20 carbon atoms as described above.

Y is preferably a divalent silicon-containing group or a divalent germanium-containing group, more preferably a divalent silicon-containing group, particularly preferably an alkylsilylene group, an alkylarylsilylene group or an arylsilylene group.

Examples of the metallocene compounds represented by the formula (I) include:

rac-dimethylsilylene-bis(4-phenyl-1-indenyl)zirconium dichloride, rac-dimethylsilylene-bis(1-(2-methyl-4-phenylindenyl)) zirconium dichloride, rac-dimethylsilylene-bis(2-methyl-4-(α-naphthyl)-1-indenyl)zirconium dichloride, rac-dimethylsilylene-bis(2-methyl-4-(β-naphthyl)-1-indenyl)zirconium dichloride, rac-dimethylsilylene-bis(2-methyl-4-(1-anthracenyl)-1-indenyl)zirconium dichloride, rac-dimethylsilylene-bis(2-methyl-4-(2-anthracenyl)-1-indenyl)zirconium dichloride, rac-dimethylsilylene-bis(2-methyl-4-(9-anthracenyl)-1-indenyl)zirconium dichloride, rac-dimethylsilylene-bis(2-methyl-4-(9-phenanthryl)-1-indenyl)zirconium dichloride, rac-dimethylsilylene-bis(2-methyl-4-(p-fluorophenyl)-1-indenyl)zirconium dichloride, rac-dimethylsilylene-bis(2-methyl-4-(pentafluorophenyl)-1-indenyl)zirconium dichloride, rac-dimethylsilylene-bis(2-methyl-4-(p-chlorophenyl)-1-indenyl)zirconium dichloride, rac-dimethylsilylene-bis(2-methyl-4-(m-chlorophenyl)-1-indenyl)zirconium dichloride, rac-dimethylsilylene-bis(2-methyl-4-(o-chlorophenyl)-1-indenyl)zirconium dichloride, rac-dimethylsilylene-bis(2-methyl-4-(o,p-dichlorophenyl)phenyl-1-indenyl)zirconium dichloride, rac-dimethylsilylene-bis(2-methyl-4-(p-bromophenyl)-1-indenyl)zirconium dichloride, rac-dimethylsilylene-bis(2-methyl-4-(p-tolyl)-1-indenyl)zirconium dichloride, rac-dimethylsilylene-bis(2-methyl-4-(m-tolyl)-1-indenyl)zirconium dichloride, rac-dimethylsilylene-bis(2-methyl-4-(o-tolyl)-1-indenyl)zirconium dichloride, rac-dimethylsilylene-bis(2-methyl-4-(o,o'-dimethylphenyl)-1-indenyl)zirconium dichloride, rac-dimethylsilylene-bis(2-methyl-4-(p-ethylphenyl)-1-indenyl)zirconium dichloride, rac-dimethylsilylene-bis(2-methyl-4-(p-i-propylphenyl)-1-indenyl)zirconium dichloride, rac-dimethylsilylene-bis(2-methyl-4-(p-benzylphenyl)-1-indenyl) zirconium dichloride, rac-dimethylsilylene-bis(2-methyl-4-(p-biphenyl)-1-indenyl)zirconium dichloride, rac-dimethylsilylene-bis(2-methyl-4-(m-biphenyl)-1-indenyl)zirconium dichloride, rac-dimethylsilylene-bis(2-methyl-4-(p-trimethylsilylenephenyl)-1-indenyl)zirconium dichloride, rac-dimethylsilylene-bis(2-methyl-4-(m-trimethylsilylenephenyl)-1-indenyl)zirconium dichloride, rac-dimethylsilylene-bis(2-phenyl-4-phenyl-1-indenyl) zirconium dichloride, rac-diethylsilylene-bis(2-methyl-4-phenyl-1-indenyl) zirconium dichloride, rac-di(i-propyl)silylene-bis(2-methyl-4-phenyl-1-indenyl)zirconium dichloride, rac-di(n-butyl)silylene-bis(2-methyl-4-phenyl-1-indenyl) zirconium dichloride, rac-dicyclohexylsilylene-bis(2-methyl-4-phenyl-1-indenyl)zirconium dichloride, rac-methylphenylsilylene-bis(2-methyl-4-phenyl-1-indenyl)zirconium dichloride, rac-diphenylsilylene-bis(2-methyl-4-phenyl-1-indenyl) zirconium dichloride, rac-di(p-tolyl)silylene-bis(2-methyl-4-phenyl-1-indenyl) zirconium dichloride, rac-di(p-chlorophenyl)silylene-bis(2-methyl-4-phenyl-1-indenyl)zirconium dichloride, rac-methylene-bis(2-methyl-4-phenyl-1-indenyl) zirconium dichloride, rac-ethylene-bis(2-methyl-4-phenyl-1-indenyl)zirconium dichloride, rac-dimethylgermylene-bis(2-methyl-4-phenyl-1-indenyl)zirconium dichloride, rac-dimethylstannylene-bis(2-methyl-4-phenyl-1-indenyl)zirconium dichloride, rac-dimethylsilylene-bis(2-methyl-4-phenyl-1-indenyl) zirconium dibromide, rac-dimethylsilylene-bis(2-methyl-4-phenyl-1-indenyl) zirconium dimethyl, rac-dimethylsilylene-bis(2-methyl-4-phenyl-1-indenyl) zirconium methylchloride, rac-dimethylsilylene-bis(2-methyl-4-phenyl-1-indenyl) zirconium chloride $SO_2Me$, rac-dimethylsilylene-bis(2-methyl-4-phenyl-1-indenyl) zirconium chloride $OSO_2Me$, rac-dimethylsilylene-bis(1-(2-ethyl-4-phenylindenyl)) zirconium dichloride, rac-dimethylsilylene-bis(1-(2-ethyl-4-(α-naphthyl) indenyl))zirconium dichloride, rac-dimethylsilylene-bis(1-(2-ethyl-4-(β-naphthyl) indenyl))zirconium dichloride, rac-dimethylsilylene-bis(1-(2-ethyl-4-(2-methyl-1-naphthyl)indenyl))zirconium dichloride, rac-dimethylsilylene-bis(1-(2-ethyl-4-(5-acenaphthyl) indenyl))zirconium dichloride, rac-dimethylsilylene-bis(1-(2-ethyl-4-(9-anthracenyl) indenyl))zirconium dichloride, rac-dimethylsilylene-bis(1-(2-ethyl-4-(9-phenanthryl) indenyl))zirconium dichloride, rac-dimethylsilylene-bis(1-(2-ethyl-4-(o-methylphenyl) indenyl))zirconium dichloride, rac-dimethylsilylene-bis(1-(2-ethyl-4-(m-methylphenyl)indenyl))zirconium dichloride,
rac-dimethylsilylene-bis(1-(2-ethyl-4-(p-methylphenyl)indenyl))zirconium dichloride,
rac-dimethylsilylene-bis(1-(2-ethyl-4-(2,3-dimethylphenyl)indenyl))zirconium dichloride,
rac-dimethylsilylene-bis(1-(2-ethyl-4-(2,4-dimethylphenyl)indenyl))zirconium dichloride,
rac-dimethylsilylene-bis(1-(2-ethyl-4-(2,5-dimethylphenyl)indenyl))zirconium dichloride,
rac-dimethylsilylene-bis(1-(2-ethyl-4-(2,4,6-trimethylphenyl)indenyl))zirconium dichloride,
rac-dimethylsilylene-bis(1-(2-ethyl-4-(o-chlorophenyl)indenyl))zirconium dichloride,
rac-dimethylsilylene-bis(1-(2-ethyl-4-(m-chlorophenyl)indenyl))zirconium dichloride,
rac-dimethylsilylene-bis(1-(2-ethyl-4-(p-chlorophenyl)indenyl))zirconium dichloride,
rac-dimethylsilylene-bis(1-(2-ethyl-4-(2,3-dichlorophenyl)indenyl))zirconium dichloride,
rac-dimethylsilylene-bis(1-(2-ethyl-4-(2,6-dichlorophenyl)indenyl))zirconium dichloride,
rac-dimethylsilylene-bis(1-(2-ethyl-4-(3,5-dichlorophenyl)indenyl))zirconium dichloride,
rac-dimethylsilylene-bis(1-(2-ethyl-4-(2-bromophenyl)indenyl))zirconium dichloride,
rac-dimethylsilylene-bis(1-(2-ethyl-4-(3-bromophenyl)indenyl))zirconium dichloride,
rac-dimethylsilylene-bis(1-(2-ethyl-4-(4-bromophenyl)indenyl))zirconium dichloride,
rac-dimethylsilylene-bis(1-(2-ethyl-4-(4-biphenylyl)indenyl))zirconium dichloride,
rac-dimethylsilylene-bis(1-(2-ethyl-4-(4-trimethylsilylphenyl)indenyl))zirconium dichloride,
rac-dimethylsilylene-bis(1-(2-n-propyl-4-phenylindenyl))zirconium dichloride,
rac-dimethylsilylene-bis(1-(2-n-propyl-4-(α-naphthyl)indenyl))zirconium dichloride,
rac-dimethylsilylene-bis(1-(2-n-propyl-4-(β-naphthyl)indenyl))zirconium dichloride,
rac-dimethylsilylene-bis(1-(2-n-propyl-4-(2-methyl-1-naphthyl)indenyl))zirconium dichloride,
rac-dimethylsilylene-bis(1-(2-n-propyl-4-(5-acenaphthyl)indenyl))zirconium dichloride,
rac-dimethylsilylene-bis(1-(2-n-propyl-4-(9-anthracenyl)indenyl))zirconium dichloride,
rac-dimethylsilylene-bis(1-(2-n-propyl-4-(9-phenanthryl)indenyl))zirconium dichloride,
rac-dimethylsilylene-bis(1-(2-i-propyl-4-phenylindenyl))zirconium dichloride,
rac-dimethylsilylene-bis(1-(2-i-propyl-4-(α-naphthyl)indenyl))zirconium dichloride,
rac-dimethylsilylene-bis(1-(2-i-propyl-4-(β-naphthyl)indenyl))zirconium dichloride,
rac-dimethylsilylene-bis(1-(2-i-propyl-4-(8-methyl-9-naphthyl)indenyl))zirconium dichloride,
rac-dimethylsilylene-bis(1-(2-i-propyl-4-(5-acenaphthyl)indenyl))zirconium dichloride,
rac-dimethylsilylene-bis(1-(2-i-propyl-4-(9-anthracenyl)indenyl))zirconium dichloride,
rac-dimethylsilylene-bis(1-(2-i-propyl-4-(9-phenanthryl)indenyl))zirconium dichloride,.
rac-dimethylsilylene-bis(1-(2-s-butyl-4-phenylindenyl))zirconium dichloride,
rac-dimethylsilylene-bis(1-(2-s-butyl-4-(α-naphthyl)indenyl))zirconium dichloride,
rac-dimethylsilylene-bis(1-(2-s-butyl-4-(β-naphthyl)indenyl))zirconium dichloride,
rac-dimethylsilylene-bis(1-(2-s-butyl-4-(2-methyl-1-naphthyl)indenyl))zirconium dichloride,
rac-dimethylsilylene-bis(1-(2-s-butyl-4-(5-acenaphthyl)indenyl))zirconium dichloride,
rac-dimethylsilylene-bis(1-(2-s-butyl-4-(9-anthracenyl)indenyl))zirconium dichloride,
rac-dimethylsilylene-bis(1-(2-s-butyl-4-(9-phenanthryl)indenyl))zirconium dichloride,
rac-dimethylsilylene-bis(1-(2-n-pentyl-4-phenylindenyl))zirconium dichloride,
rac-dimethylsilylene-bis(1-(2-n-pentyl-4-(α-naphthyl)indenyl))zirconium dichloride,
rac-dimethylsilylene-bis(1-(2-n-butyl-4-phenylindenyl))zirconium dichloride,
rac-dimethylsilylene-bis(1-(2-n-butyl-4-(α-naphthyl)indenyl))zirconium dichloride,
rac-dimethylsilylene-bis(1-(2-n-butyl-4-(β-naphthyl)indenyl))zirconium dichloride,
rac-dimethylsilylene-bis(1-(2-n-butyl-4-(2-methyl-1-naphthyl)indenyl))zirconium dichloride,
rac-dimethylsilylene-bis(1-(2-n-butyl-4-(5-acenaphthyl)indenyl))zirconium dichloride,
rac-dimethylsilylene-bis(1-(2-n-butyl-4-(9-anthracenyl)indenyl))zirconium dichloride,
rac-dimethylsilylene-bis(1-(2-n-butyl-4-(9-phenanthryl)indenyl))zirconium dichloride,
rac-dimethylsilylene-bis(1-(2-i-butyl-4-phenylindenyl))zirconium dichloride,
rac-dimethylsilylene-bis(1-(2-i-butyl-4-(α-naphthyl)indenyl))zirconium dichloride,
rac-dimethylsilylene-bis(1-(2-i-butyl-4-(β-naphthyl)indenyl))zirconium dichloride,
rac-dimethylsilylene-bis(1-(2-i-butyl-4-(2-methyl-1-naphthyl)indenyl))zirconium dichloride,
rac-dimethylsilylene-bis(1-(2-i-butyl-4-(5-acenaphthyl)indenyl))zirconium dichloride,
rac-dimethylsilylene-bis(1-(2-i-butyl-4-(9-anthracenyl)indenyl))zirconium dichloride,
rac-dimethylsilylene-bis(1-(2-i-butyl-4-(9-phenanthryl)indenyl))zirconium dichloride,
rac-dimethylsilylene-bis(1-(2-neopentyl-4-phenylindenyl))zirconium dichloride,
rac-dimethylsilylene-bis(1-(2-neopentyl-4-(α-naphthyl)indenyl))zirconium dichloride,
rac-dimethylsilylene-bis(1-(2-n-hexyl-4-phenylindenyl))zirconium dichloride,
rac-dimethylsilylene-bis(1-(2-n-hexyl-4-(α-naphthyl)indenyl))zirconium dichloride,
rac-methylphenylsilylene-bis(1-(2-ethyl-4-phenylindenyl))zirconium dichloride,
rac-methylphenylsilylene-bis(1-(2-ethyl-4-(α-naphthyl)indenyl))zirconium dichloride,
rac-methylphenylsilylene-bis(1-(2-ethyl-4-(9-anthracenyl)indenyl))zirconium dichloride,
rac-methylphenylsilylene-bis(1-(2-ethyl-4-(9-phenanthryl)indenyl))zirconium dichloride, rac-diphenylsilylene-bis(1-(2-ethyl-4-phenylindenyl))
  zirconium dichloride,
rac-diphenylsilylene-bis(1-(2-ethyl-4-(α-naphthyl)
  indenyl))zirconium dichloride,
rac-diphenylsilylene-bis(1-(2-ethyl-4-(9-anthracenyl)
  indenyl))zirconium dichloride,
rac-diphenylsilylene-bis(1-(2-ethyl-4-(9-phenanthryl)
  indenyl))zirconium dichloride,
rac-diphenylsilylene-bis(1-(2-ethyl-4-(4-biphenylyl)
  indenyl))zirconium dichloride,
rac-methylene-bis(1-(2-ethyl-4-phenylindenyl))
  zirconium dichloride,
rac-methylene-bis(1-(2-ethyl-4-(α-naphthyl)indenyl))
  zirconium dichloride,
rac-ethylene-bis (1-(2-ethyl-4-phenylindenyl))zirconium
  dichloride,
rac-ethylene-bis(1-(2-ethyl-4-(α-naphthyl)indenyl))
  zirconium dichloride,
rac-ethylene-bis(1-(2-n-propyl-4-(α-naphthyl)indenyl))
  zirconium dichloride,
rac-dimethylgermyl-bis(1-(2-ethyl-4-phenylindenyl))
  zirconium dichloride,
rac-dimethylgermyl-bis(1-(2-ethyl-4-(α-naphthyl)
  indenyl))zirconium dichloride, and
rac-dimethylgermyl-bis(1-(2-n-propyl-4-phenylindenyl))
  zirconium dichloride.

Compounds wherein zirconium is replaced with titanium or hafnium in the above compounds are also employable.

In the present invention, a racemic modification of the metallocene compound is usually used as the catalyst component, but R-form or S-form may be used.

In the present invention, the metallocene compounds mentioned above may be used in combination of two or more kinds.

Such metallocene compounds can be prepared in accordance with European Patent No. 0,320,762A and Journal of Organometallic Chem. 288 (1985), pp. 63–67.

Other than the metallocene compound represented by the formula (I), a metallocene compound represented by the following formula (II) is also employable.

$$L^aMX_2 \quad (II)$$

In the above formula, M is a metal of Group IV of the periodic table or a metal of lanthanide series, $L^a$ is a derivative of a delocalized n-bonding group and imparts a restraint geometric shape to the active site of the metal M, and each X is independently a hydrogen atom, a halogen atom, a hydrocarbon group having 20 or less carbon atoms, a silyl group having 20 or less silicon atoms, or a germyl group having 20 or less germanium atoms.

Of the compounds represented by the formula (II), a compound represented by the following formula (III) is preferable.

(III)

In the above formula, M is titanium, zirconium or hafnium, and X is the same as above.

Cp is π-bonded to M and is a substituted cyclopentadienyl group having a substituent Z or its derivative.

Z is oxygen, sulfur, boron or an element of Group IVA of the periodic table.

Y is a ligand containing nitrogen, phosphorus, oxygen or sulfur.

Z and Y may together form a condensed ring.

Examples of the metallocene compounds represented by the formula (III) include:

(dimethyl(t-butylamido)(tetramethyl-$\eta^5$-cyclopentadienyl)silane)titanium dichloride, ((t-butylamido)(tetramethyl-$\eta^5$-cyclopentadienyl)-1,2-ethanediyl)titanium dichloride, (dibenzyl(t-butylamido)(tetramethyl-$\eta^5$-cyclopentadienyl)silane)titanium dichloride, (dimethyl(t-butylamido)(tetramethyl-$\eta^5$-cyclopentadienyl)silane)dibenzyltitanium, (dimethyl(t-butylamido)(tetramethyl-$\eta^5$-cyclopentadienyl)silane)dimethyltitanium, ((t-butylamido)(tetramethyl-$\eta^5$-cyclopentadienyl)-1,2-ethanediyl)dibenzyltitanium, ((methylamido)(tetramethyl-$\eta^5$-cyclopentadienyl)-1,2-ethanediyl)dineopentyltitanium, ((phenylphosphido)(tetramethyl-$\eta^5$-cyclopentadienyl)methylene)diphenyltitanium, (dibenzyl(t-butylamido)(tetramethyl-$\eta^5$-cyclopentadienyl)silane)dibenzyltitanium, (dimethyl(benzylamido)($\eta^5$-cyclopentadienyl)silane)di(trimethylsilyl)titanium, (dimethyl(phenylphosphido)(tetramethyl-$\eta^5$-cyclopentadienyl)silane)dibenzyltitanium, ((tetramethyl-$\eta^5$-cyclopentadienyl)-1,2-ethanediyl)dibenzyltitanium, (2-$\eta^5$-(tetramethyl-cyclopentadienyl)-1-methyl-ethanolate(2-))dibenzyltitanium, (2-$\eta^5$-(tetramethyl-cyclopentadienyl)-1-methyl-ethanolate(2-))dimethyltitanium, (2-((4a,4b,8a,9,9a-$\eta$)-9H-fluorene-9-yl)cyclohexanolate(2-))dimethyltitanium, and (2-((4a,4b,8a,9,9a-$\eta$)-9H-fluorene-9-yl)cyclohexanolate(2-))dibenzyltitanium.

In the present invention, the metallocene compounds represented by the formula (II) may be used in combination of two or more kinds.

Although titanium compounds are given above as examples of the metallocene compounds, compounds wherein titanium is replaced with zirconium or hafnium in those compounds are also employable.

The compounds mentioned above may be used singly or in combination of two or more kinds.

Of the metallocene compounds mentioned above, the metallocene compound represented by the formula (I) is preferably used in the preparation of the long-chain branched ethylene/α-olefin random copolymer (A).

Organoaluminum Oxy-compound (b)

The organoaluminum oxy-compound (b) for use in the invention may be aluminoxane hitherto known or such a benzene-insoluble organoaluminum oxy-compound as exemplified in Japanese Patent Laid-Open Publication No. 78687/1990.

The hitherto known aluminoxane can be prepared by, for example, the following processes.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization, and the aluminoxane is recovered as a hydrocarbon solution.

(2) Water, ice or water vapor is allowed to directly act on an organoaluminum compound such as trialkylaluminum in a medium such as benzene, toluene, ethyl ether or tetrahydrofuran, and the aluminoxane is recovered as a hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. It is also available to distill off the solvent or the unreacted organoaluminum compound from the recovered solution of aluminoxane, followed by redissolving the remainder in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, trialkylaluminums and tricycloalkylaluminums are particularly preferable.

As the organoaluminum compound used for preparing the aluminoxane, isoprenylaluminum represented by the formula $(i\text{-}C_4H_9)_xAl_y(C_5H_{10})_z$ (wherein x, y and z are each a positive number, and $z \geq 2x$) is also employable.

The organoaluminum compounds mentioned above may be used in combination of two or more kinds.

Examples of the solvents used for preparing the aluminoxane include:

aromatichydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosine and gas oil; and halogenated products of the above aromatic, aliphatic and alicyclic hydrocarbons, particularly chlorinated or brominated products thereof.

Ethers such as ethyl ether and tetrahydrofuran are also employable. Of the solvents, aromatic hydrocarbons are particularly preferable.

Compound (c) Which Reacts with the Metallocene Compound (a) to Form Ion Pair

Examples of the compounds (c) which react with the metallocene compound (a) to form an ion pair include Lewis acid, an ionic compound, a borane compound and a carborane compound described in National Publications of International Patent No. 501950/1989 and No. 502036/1989, Japanese Patent Laid-Open Publications No. 179005/1991, No. 179006/1991, No. 207703/1991 and No. 207704/1991, and U.S. Pat. No. 547,718.

The Lewis acid includes Mg-containing Lewis acid, Al-containing Lewis acid and B-containing Lewis acid. Of these, B-containing Lewis acid is preferable.

The Lewis acid containing a boron atom is, for example, a compound represented by the following formula:

$$BR^1R^2R^3$$

wherein $R^1$, $R^2$ and $R^3$ are each independently a phenyl group which may have a substituent group such as fluorine, methyl or trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, tris(pentafluorophenyl) boron is particularly preferable.

The ionic compound for use in the invention is a salt comprising a cationic compound and an anionic compound. The anion reacts with the metallocene compound (a) to render the metallocene compound (a) cationic and to form an ion pair so as to stabilize the transition metal cationic species. Examples of such anions include organoboron compound anion, organoarsenic compound anion and organoaluminum compound anion. An anion which is relatively bulky and stabilizes the transition metal cationic species is preferable. Examples of cations include metallic cation, organometallic cation, carbonium cation, tropylium cation, oxonium cation, sulfonium cation, phosphonium cation and ammonium cation. Specifically, there can be mentioned, for example, triphenylcarbenium cation, tributylammonium cation, N,N-dimethylammonium cation and ferrocenium cation.

In the present invention, an ionic compound containing organoboron compound anion is preferable. Examples of such compounds include:

trialkyl-substituted ammonium salts, such as triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl) boron, tri(n-butyl)ammoniumtetra(o-tolyl)boron and tri(n-butyl)ammoniumtetra(4-fluorophenyl)boron;

N,N,-dialkylanilinium salts, such as N,N-dimethylaniliniumtetra(phenyl)boron, N,N-diethylaniliniumtetra(phenyl)boron and N,N-2,4,6-pentamethylaniliniumtetra(phenyl)boron;

dialkylammonium salts, such as di(n-propyl)ammoniumtetra(pentafluorophenyl)boron and dicyclohexylammoniumtetra(phenyl)boron; and triarylphosphite salts, such as triphenylphosphoniumtetra (phenyl)boron, tri(methylphenyl)phosphoniumtetra (phenyl)boron and tri(dimethylphenyl) phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate are also employable in the invention.

The following ionic compounds containing a boron atom are also employable. (In the ionic compounds enumerated below, the counter ion is tri(n-butyl)ammonium, but the counter ion is not limited thereto.)

That is, there can be mentioned salts of anions, such as bis(tri(n-butyl)ammonium)nonaborate, bis(tri(n-butyl) ammonium)decaborate, bis(tri(n-butyl)ammonium) undecaborate, bis(tri(n-butyl)ammonium)dodecaborate, bis (tri (n-butyl)ammonium)decachlorodecaborate, bis(tri (n-butyl)ammonium)dodecachlorododecaborate, tri(n-butyl)ammonium-1-carbadecaborate, tri(n-butyl) ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

The following borane compounds and carborane compounds are also employable. These compounds are each used as Lewis acid or an ionic compound.

Examples of the borane compounds, carborane complex compounds and salts of carborane anions include decaborane(14), 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl) ammoniumdodecahydrido-8-methyl-7,9-dicarbaundecaborate, tri(n-butyl)ammoniumundecahydrido-8-ethyl-7,9-dicarbaundecaborate, tri(n-butyl) ammoniumundecahydrido-8-butyl-7,9-dicarbaundecaborate, tri(n-butyl)ammoniumundecahydrido-8-allyl-7,9-dicarbaundecaborate, tri(n-butyl) ammoniumundecahydrido-9-trimethylsilyl-7,8-dicarbaundecaborate and tri(n-butyl) ammoniumundecahydrido-4,6-dibromo-7-carbaundecaborate.

Examples of the carborane compounds and salts of carboranes include 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane and undecahydrido-1,3-dimethyl-1,3-dicarbanonaborane.

The following compounds are also employable. (In the ionic compounds enumerated below, the counter ion is tri(n-butyl)ammonium, but the counter ion is not limited thereto.)

Examples of salts of metallic carboranes and metallic borane anions include tri(n-butyl)ammoniumbis (nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis (undecahydrido-7,8-dicarbaundecaborate)cobaltate(III), tri (n-butyl)ammoniumbis(undecahydrido-7,8-dicarbaundecaborate)nickelate(III), tri(n-butyl) ammoniumbis(undecahydrido-7,8-dicarbaundecaborate) cuprate(III), tri(n-butyl)ammoniumbis(undecahydrido-7,8-dicarbaundecaborate)aurate(III), tri(n-butyl)ammoniumbis (nonahydrido-7,8-dimethyl-7,8-dicarbaundecaborate)ferrate (III), tri(n-butyl)ammoniumbis(nonahydrido-7,8-dimethyl-7,8-dicarbaundecaborate)chromate(III), tri(n-butyl) ammoniumbis(tribromooctahydrido-7,8-dicarbaundecaborate)cobaltate(III), tri(n-butyl) ammoniumbis(dodecahydridodicarbadodecaborate)-cobalatate(III), bis(tri(n-butyl)ammonium)bis (dodecahydridododecaborate)-nickelate(III), tris(tri(n-butyl)ammonium)bis(undecahydrido-7-carbaundecaborate) chromate(III), bis(tri(n-butyl)ammonium)bis (undecahydrido-7-carbaundecaborate)manganate (IV), bis (tri (n-butyl)ammoniumbis(undecahydrido-7-carbaundecaborate)cobaltate(III) and bis(tri(n-butyl) ammonium)bis(undecahydrido-7-carbaundecaborate) nickelate(IV).

The compounds (c) mentioned above may be used in combination of two or more kinds.

Organoaluminum Compound (d)

The organoaluminum compound (d) for use in the invention can be represented by, for example, the following formula:

$R^5_n AlX_{3-n}$ wherein $R^5$ is a hydrocarbon group of 1 to 12 carbon atoms, X is a halogen atom or a hydrogen atom, and n is 1 to 3.

In the above formula, $R^5$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of the organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (d) is a compound represented by the following formula:

$R^5_n AlY_{3-n}$ wherein $R^5$ is the same as $R^5$ in the formula; Y is —$OR^6$ group, —$OSiR^7_3$ group, —$OAlR^8_2$ group, —$NR^9_2$ group, —$SiR^{10}_3$ group or —$N(R^{11})AlR^{12}_2$ group; n is 1 to 2; $R^6$, $R^7$, $R^8$ and $R^{12}$ are each methyl, ethyl, isopropyl, isobutyl, cyclohexyl, phenyl or the like; $R^9$ is hydrogen, methyl, ethyl, isopropyl, phenyl, trimethylsilyl or the like; and $R^{10}$ and $R^{11}$ are each methyl, ethyl or the like.

Examples of such organoaluminum compounds include:

(i) compounds represented by $R^5_n Al(OR^6)_{3-n}$, such as dimethylaluminum methoxide, diethylaluminum ethoxide and diisobutylaluminum methoxide;

(ii) compounds represented by $R^5{}_nAl(OSiR^7{}_3)_{3-n}$, such as $(C_2H_5)_2Al(OSi(CH_3)_3)$, $(iso\text{-}C_4H_9)_2Al(OSi(CH_3)_3)$ and $(iso\text{-}C_4H_9)_2Al(OSi(C_2H_5)_3)$;

(iii) compounds represented by $R^5{}_nAl(OAlR^8{}_2)_{3-n}$, such as $(C_2H_5)_2Al(OAl(C_2H_5)_2)$ and $(iso\text{-}C_4H_9)_2Al(OAl(iso\text{-}C_4H_9)_2)$;

(iv) compounds represented by $R^5{}_nAl(NR^9{}_2)_{3-n}$, such as $(CH_3)_2Al(N(C_2H_5)_2)$, $(C_2H_5)_2Al(NH(CH_3))$, $(CH_3)_2Al(NH(C_2H_5))$, $(C_2H_5)_2Al(N(Si(CH_3)_3)_2)$ and $(iso\text{-}C_4H_9)_2Al(N(Si(CH_3)_3)_2)$; and (v) compounds represented by $R^5{}_nAl(SiR^{10}{}_3)_{3-n}$, such as $(iso\text{-}C_4H_9)_2Al(Si(CH_3)_3)$.

Of these, organoaluminum compounds represented by $R^5{}_nAl$, $R^5{}_nAl(OR^6)_{3-n}$ and $R^5{}_nAl(OAlR^8{}_2)_{3-n}$ are preferred, and compounds wherein $R^5$ is an isoalkyl group and n is 2 are particularly preferred. The organoaluminum compounds mentioned above may be used in combination of two or more kinds.

The specific metallocene catalyst for use in the invention contains the metallocene compound (a), and the catalyst can be prepared from, for example, the metallocene compound (a) and the organoaluminum oxy-compound (b). The metallocene catalyst may be formed from the metallocene compound (a) and the compound (c) which reacts with the metallocene compound (a) to form an ion pair, or may be formed from the metallocene compound (a), the organoaluminum oxy-compound (b) and the compound (c) which reacts with the metallocene compound (a) to form an ion pair. In these embodiments, it is particularly preferable to use the organoaluminum compound (d) in combination.

In the present invention, the metallocene compound (a) is used in an amount of usually about 0.00005 to 0.1 mmol, preferably about 0.0001 to 0.05 mmol, in terms of the transition metal atom, based on 1 liter of the polymerization volume.

The organoaluminum oxy-compound (b) can be used in such an amount that the amount of the aluminum atom becomes usually about 1 to 10,000 mol, preferably 10 to 5,000 mol, based on 1 mol of the transition metal atom.

The compound (c) which reacts with the metallocene compound (a) to form an ion pair is used in such an amount that the amount of the boron atom becomes usually about 0.5 to 20 mol, preferably 1 to 10 mol, based on 1 mol of the transition metal atom.

The organoaluminum compound (d) is used, if necessary, in an amount of usually about 0 to 1,000 mol, preferably about 0 to 500 mol, based on 1 mol of the aluminum atom in the organoaluminum oxy-compound (b) or the boron atom in the compound (c) which forms an ion pair.

When ethylene and an α-olefin of 3 to 20 carbon atoms are copolymerized using the above-described metallocene catalyst, the long-chain branched ethylene/α-olefin random copolymer (A) can be obtained with a high polymerization activity.

Further, the long-chain branched ethylene/α-olefin random copolymer (A) can be obtained with a high polymerization activity also by copolymerizing ethylene and an α-olefin of 3 to 20 carbon atoms using a Group VB transition metal compound type catalyst such as a vanadium catalyst.

In the copolymerization of ethylene and the α-olefin of 3 to 20 carbon atoms, the metallocene compound (a), the organoaluminum oxy-compound (b), the compound (c) for forming an ion pair and the organoaluminum compound (d), which are used to form a metallocene catalyst, may be individually fed to a polymerization reactor, or a previously prepared metallocene catalyst containing the metallocene compound (a) may be used for the copolymerization reaction.

In the preparation of the metallocene catalyst, a hydrocarbon solvent that is inert to the catalyst components can be used. Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbon solvents can be used singly or in combination.

The metallocene compound (a), the organoaluminum oxy-compound (b), the compound (c) which forms an ion pair, and the organoaluminum compound (d) can be contacted and mixed with each other at a temperature of usually −100 to 200° C., preferably −70 to 100° C.

In the present invention, copolymerization of ethylene and the α-olefin of 3 to 20 carbon atoms can be carried out under the conditions of a temperature of usually 40 to 200° C., preferably 50 to 150° C., particularly preferably 60 to 120° C., and a pressure of atmospheric pressure to 100 $kg/cm^2$, preferably atmospheric pressure to 50 $kg/cm^2$, particularly preferably atmospheric pressure to 30 $kg/cm^2$.

Although the copolymerization reaction can be conducted by various polymerization processes, it is preferable to conduct the copolymerization by a solution polymerization process. In the solution polymerization, the aforesaid hydrocarbon solvents are employable as the polymerization solvents.

Although the copolymerization can be conducted by any of batchwise, semi-continuous and continuous processes, it is preferable to conduct the copolymerization continuously. The polymerization may be carried out in two or more steps under different reaction conditions.

The long-chain branched ethylene/α-olefin random copolymer (A) for use in the invention is obtained by the aforesaid process, and the molecular weight of the copolymer can be regulated by changing the polymerization conditions such as polymerization temperature or controlling the amount of hydrogen (molecular weight modifier) used.

Polypropylene Resin (B)

The polypropylene resin (B) for use in the invention has MFR (melt flow rate, ASTM D 1238, 230° C., load: 2.16 kg) of 1 to 150 g/10 min, preferably 5 to 100 g/10 min, more preferably 7 to 50 g/10 min, and an initial flexural modulus (ASTM D 790) of not more than 1500 MPa, preferably not more than 1300 MPa, more preferably 500 to 1000 MPa.

The polypropylene resin (B) is a propylene homopolymer, a propylene random copolymer or a propylene block copolymer, and preferably used is a propylene random copolymer or a propylene block copolymer. Such copolymers are prepared by, for example, processes described in Japanese Patent Laid-Open Publications No. 84404/1990 and No. 229807/1990.

In the present invention, the polypropylene resin (B) is used in an amount of 2 to 200 parts by weight, preferably 2 to 65 parts by weight, more preferably 2 to 55 parts by weight, particularly preferably 5 to 45 parts by weight, based on 100 parts by weight of the ethylene/α-olefin random copolymer (A). When the ethylene/α-olefin random copolymer (A) and the polypropylene resin (B) are used in the above proportion, a polypropylene resin-containing flexible resin composition which can provide molded products well-balanced among flexibility, heat resistance and compression set (CS) and having improved scratch resistance and transparency and which exhibits such high flowability as to cause excellent moldability can be obtained.

Other Components

To the flexible resin composition of the invention, additives, such as antioxidant, ultraviolet light absorber, light protective agent, phosphite type heat stabilizer, peroxide decomposer, basic co-stabilizer, nucleating agent, plasticizer, lubricant, antistatic agent, flame retardant, pigment, dye and filler, can be optionally added in amounts not detrimental to the object of the invention, in addition to the ethylene/α-olefin random copolymer (A) and the polypropylene resin (B).

Examples of the fillers include carbon black, asbestos, talc, silica and silica alumina.

To the flexible resin composition of the invention, further, other polymers may be added in amounts not detrimental to the object of the invention.

Examples of such polymers include EPT, polypropylene, and various engineering plastic resins such as polyamides and polyesters..

Preparation of Flexible Resin Composition

The flexible resin composition of the invention is prepared by melt mixing the ethylene/α-olefin random copolymer (A), the polypropylene resin (B), and optionally, the aforesaid additives by various methods hitherto known.

That is, the flexible resin composition of the invention is obtained by simultaneously or successively feeding the above components to a Henschel mixer, a V-type blender, a tumbling mixer, a ribbon blender or the like, mixing them therein and melt kneading the mixture in a kneading device such as a single-screw extruder, a multi-screw extruder, a kneader or a Banbury mixer.

By the use of a kneading device having excellent kneading ability, such as an extruder, a kneader or a Banbury mixer, a polypropylene resin-containing flexible resin composition of high quality wherein each component is homogeneously dispersed can be obtained.

The additives such as an antioxidant can be added in any stage of the above process.

The flexible resin composition of the invention obtained as above can be molded into various shapes by various melt molding methods hitherto known, such as injection molding, extrusion molding and compression molding.

The resin compositions for injection molding, extrusion molding and compression molding according to the invention comprise the above-described flexible resin composition of the invention.

The flexible resin molded product according to the invention comprises the above-described flexible resin composition of the invention. This molded product may be a flexible resin sheet.

EXAMPLE

The present invention is further described with reference to the following examples, but it should be construed that the invention is in no way limited to those examples.

Example 1

Preparation of Ethylene/1-octene Random Copolymer

Preparation of Catalyst Solution

In a glass flask thoroughly purged with nitrogen, 0.5 mg of rac-dimethylsilylene-bis(1-(2-methyl-4-phenylindenyl)) zirconium dichloride was placed. Then, 1.57 ml of a toluene solution of methylaluminoxane (Al: 1.1 mol/l) and 2.76 ml of toluene were added to obtain a catalyst solution.

Polymerization

In a 2-liter stainless steel autoclave thoroughly purged with nitrogen, 600 ml of hexane and 300 ml of 1-octene were placed, and the temperature of the system was raised to 60° C. Then, 1 mmol of triisobutylaluminum and 0.5 ml (0.001 mmol in terms of Zr) of the catalyst solution prepared above were forced into the autoclave with ethylene to initiate polymerization. Thereafter, only ethylene was continuously fed to maintain the total pressure at 3.0 kg/cm$^2$-G, and polymerization was conducted at 70° C. for 60 minutes. A small amount of ethanol was added to the system to terminate the polymerization, and the system was purged of the unreacted ethylene. The resulting polymer solution was introduced into a large excess of methanol to precipitate a polymer. The polymer was recovered by filtration and dried one night under reduced pressure to obtain a long-chain branched ethylene/ 1-octene random copolymer.

The copolymer thus obtained had A 1-octene content of 14% by mol, a density of 0.870 g/cm$^3$, an intrinsic viscosity (η), as measured in decalin at 135° C. of 1.5 dl/g, a glass transition temperature (Tg) of −64° C., a crystallinity, as measured by X-ray diffractometry, of 5%, a molecular weight distribution (Mw/Mn) , as determined by GPC, of 2.2, a B value of 1.00 and a gη* value of 0.880.

Preparation of Flexible Resin Composition Containing Polypropylene Resin

50 Parts by weight of a propylene random copolymer (available f rom Grand Polymer K.K., MFR (230° C., load of 2.16 kg): 7.0 g/10 min, melting point (Tm): 142° C., initial flexural modulus (ASTM D 790): 940 MPa) and 50 parts by weight of pellets of the above obtained ethylene/ 1-octene random copolymer were mixed by a Henschel mixer to prepare a dry blend.

Then, the dry blend was fed to a single-screw extruder (L/D: 27, diameter: 30 mm) preset at 180° C. to prepare pellets of a flexible resin composition.

The pellets of the flexible resin composition thus obtained were molded under the following conditions to prepare a property test specimen.

Conditions to Prepare Pressed Sheet

Size of pressed sheet: 200 mm×200 mm×2 mm (thickness)
   Mold temperature: 200° C.
   Pressure: 160 kg/cm$^2$
   Pressing time: 10 minutes
   Cooling time under pressure: 5 minutes
   Cooling temperature: 20° C.

Injection Molding Conditions

Cylinder temperature: 180° C.
   Injection pressure: 500 kg/cm$^2$
   Mold temperature: 30° C.

Subsequently, properties of the flexible resin composition were evaluated by the following methods.

(1) Surface Hardness

The surface hardness was measured in accordance with JIS K 6301 using the pressed sheet obtained above.

(2) Torsional Rigidity

The torsional rigidity was measured in accordance with ASTM D 1043 using the pressed sheet obtained above.

(3) Heat Deformation

The pressed sheet obtained above was cut to give a strip of 7.0 mm×80 mm, and the strip was fixed to a cantilever beam (span: 50 mm) to measure deformation of a tip of the strip caused by gravity under the conditions of 50° C.×1.5 hr and 0° C.×0.5 hr.

(4) Compression Set (CS)

The compression set was measured in accordance with JIS K 6262.

The results are set forth in Table 1.

Example 2

A flexible resin composition containing a propylene random copolymer was prepared in the same manner as in Example 1, except that the blending ratio of the propylene random copolymer to the ethylene/1-octene random copolymer was changed to 30 parts by weight/70 parts by weight. Then, properties of the resin composition were measured in the same manner as in Example 1.

The results are set forth in Table 1.

Comparative Example 1

A catalyst solution was prepared in the same manner as in Example 1, except that bis(1 3-dimethylcyclopentadienyl) zirconium dichloride was used instead of rac-dimethylsilylene-bis(1-(2-methyl-4-phenylindenyl)) zirconium dichloride.

Using the catalyst solution, a linear ethylene/1-octene random copolymer was prepared in the same manner as in Example 1.

The copolymer thus obtained had a 1-octene content of 14% by mol, a density of 0.872 g/cm$^3$, an intrinsic viscosity (η), as measured in decalin at 135° C., of 1.5 dl/g, a glass transition temperature (Tg) of −6° C., a crystallinity, as measured by X-ray diffractometry, of 6%, a molecular weight distribution (Mw/Mn), as determined by GPC, of 2.2, a B value of 1.03 and a gη* value of 1.00.

Using the ethylene/1-octene random copolymer, a flexible resin composition containing a polypropylene resin was prepared in the same manner as in Example 1. Then, surface hardness, torsional rigidity, heat deformation and compression set (CS) were measured in the same manner as in Example 1.

The results are set forth in Table 1.

Comparative Example 2

A flexible resin composition containing a polypropylene resin was prepared in the same manner as in Comparative Example 1, except that the ethylene/1-octene random copolymer prepared in Comparative Example 1 was used and the blending ratio of the propylene random copolymer to the ethylene/1-octene random copolymer was changed to 30 parts by weight/70 parts by weight. Then, surface hardness, torsional rigidity, heat deformation and compression set (CS) ere measured in the same manner as in Comparative Example 1.

The results are set forth in Table 1.

TABLE 1

| | Unit | Ex. 1 | Ex. 2 | Comp. Ex. 1 | Comp. Ex. 2 |
|---|---|---|---|---|---|
| Ethylene α-olefin random copolymer | | | | | |
| Content of 1-octene | mol % | 14 | | 14 | |
| Density | kg/m$^3$ | 871 | | 872 | |
| Intrinsic viscosity (η) | dl/g | 1.5 | | 1.5 | |
| Glass transition temperature | ° C. | −64 | | −62 | |
| Crystallization degree | % | 5 | | 6 | |
| Mw/Mn | — | 2.2 | | 2.2 | |
| B value | — | 1.00 | | 1.03 | |
| gη* | — | 0.88 | | 1.00 | |
| Compounding of flexible resin composition | | | | | |
| Ethylene α-olefin random copolymer | Part by wt. | 50 | 70 | 50 | 70 |
| Polypropylene resin (*1) | Part by wt. | 50 | 30 | 50 | 30 |
| Properties of flexible resin composition | | | | | |
| Surface hardness | JIS-A | 95 | 83 | 95 | 83 |
| Torsional rigidity (23° C.) | MPa | 65 | 9 | 68 | 10 |
| Heat deformation (50° C. × 1.5 hr) | mm | 0.8 | 3.8 | 1.4 | 5.7 |
| Heat deformation (70° C. × 0.5 hr) | mm | 1.0 | 15.8 | 1.5 | 18.4 |
| Compression set (CS) | % | 70 | 82 | 77 | 90 |

*1: Propylene random polymer having MFR(230° C.) = 7.0 g/10 min. and initial flexural modulus of 940 MPa

EFFECT OF THE INVENTION

The flexible resin composition of the invention comprises the ethylene/α-olefin random copolymer (A), which comprises ethylene and an α-olefin of 3 to 20 carbon atoms, and a polypropylene resin (B) in a specific ratio. The copolymer (A) has a density, an intrinsic viscosity, a glass transition temperature, a crystallinity, a molecular weight distribution, a B value and a gη* value in the specific ranges, and the polypropylene resin (B) has MFR and an initial flexural modulus in the specific ranges. Hence, the flexible resin composition can provide molded products which are well balanced among flexibility, heat resistance and compression set (CS) and which have improved scratch resistance and transparency. Moreover, the flexible resin composition is excellent in various moldability such as injection moldability, extrusion moldability and compression moldability.

The flexible resin composition of the invention has excellent moldability, and hence it can be favorably used as a resin composition for injection molding, extrusion molding and compression molding.

The flexible resin molded product of the invention is produced from the flexible resin composition of the invention, and hence it is well balanced among flexibility, heat resistance and compression set and has excellent scratch resistance and transparency.

What is claimed is:

1. A flexible resin composition comprising:
   (A) 100 parts by weight of a long-chain branched ethylene/α-olefin random copolymer comprising ethylene and an α-olefin of 3 to 20 carbon atoms, and (B) 2 to 200 parts by weight of a polypropylene resin; the ethylene/α-olefin random copolymer (A) having:
(i) a density of not more than 0.900 g/cm³,
(ii) an intrinsic viscosity (η) as measured in decalin at 135° C. in the range of 0.3 to 3.0 dl/g,
(iii) a glass transition temperature (Tg) of not higher than −50° C.,
(iv) a crystallinity as measured by X-ray diffractometry of less than 40%,
(v) a molecular weight distribution (Mw/Mn) as determined by GPC of not more than 3.0,
(vi) a B value as determined by the $^{13}$C-NMR spectrum and the following formula of in the range of 0.9 to 1.4, $$B = P_{OE}/(2 P_O \cdot P_E)$$

wherein $P_E$ and $P_O$ are a molar fraction of an ethylene component and a molar fraction of an α-olefin component, respectively, contained in the ethylene/α-olefin random copolymer (A) and $P_{OE}$ is a proportion of the number of ethylene/α-olefin alternating sequences to the number of all dyad sequences, and
(vii) a ratio (gη* value, (η)/(η)blank) of the intrinsic viscosity (η) that is measured as the property (ii) to the intrinsic viscosity (η)blank of a linear ethylene/propylene copolymer having a weight average molecular weight (measured by a light scattering method) identical with that of the copolymer (A) and having an ethylene content of 70% by mol of in the range of 0.2 to 0.95; and
the polypropylene resin (B) having:
(i) an MFR (ASTM D 1238, 230° C., load: 2.16 kg) of in the range of 1 to 150 g/10 min, and
(ii) an initial flexural modulus (ASTM D 790) of not more than 1500 MPa.

2. The flexible resin composition as claimed in claim 1, wherein the polypropylene resin (B) is contained in an amount of 2 to 65 parts by weight based on 100 parts by weight of the ethylene/α-olefin random copolymer (A).

3. The flexible resin composition as claimed in claim 1, wherein the ethylene/α-olefin random copolymer (A) is an ethylene/α-olefin random copolymer obtained by random copolymerizing ethylene and an α-olefin of 3 to 20 carbon atoms in the presence of a metallocene catalyst containing a metallocene compound represented by the following formula (I):

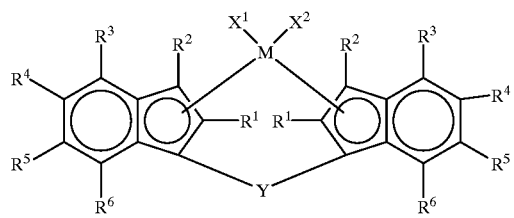

(I)

wherein M is a transition metal of Group IVB of the periodic table,
$R^1$ is a hydrocarbon group of 1 to 6 carbon atoms,
$R^2$, $R^4$, $R^5$ and $R^6$ are the same or different and are each a hydrogen atom, a halogen atom or a hydrocarbon group of 1 to 6 carbon atoms,
$R^3$ is an aryl group of 6 to 16 carbon atoms, which may be substituted with a halogen atom, a hydrocarbon group of 1 to 20 carbon atoms or an organosilyl group,
$X^1$ and $X^2$ are each a hydrogen atom, a halogen atom, a hydrocarbon group of 1 to 20 carbon atoms, an halogenated hydrocarbon group of 1 to 20 carbon atoms, an oxygen-containing group or a sulfur-containing group, and
Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR—, —P(R$^7$)—, —P(O)(R$^7$)—, —BR$^7$— or —AlR$^7$— (where R$^7$ is a hydrogen atom, a halogen atom, a hydrocarbon group of 1 to 20 carbon atoms or a halogenated hydrocarbon group of 1 to 20 carbon atoms).

4. An injection molding resin composition comprising the flexible resin composition of any one of claims 1 to 3.

5. An extrusion molding resin composition comprising the flexible resin composition of any one of claims 1 to 3.

6. A compression molding resin composition comprising the flexible resin composition of any one of claims 1 to 3.

7. A flexible resin molded product comprising the resin composition of any one of claims 1 to 6.

8. The flexible resin molded product as claimed in claim 7, which is a flexible resin sheet.

9. The flexible resin composition as claimed in claim 2, wherein the ethylene/α-olefin random copolymer (A) is an ethylene/α-olefin random copolymer obtained by random copolymerizing ethylene and an α-olefin of 3 to 20 carbon atoms in the presence of a metallocene catalyst containing a metallocene compound represented by the following formula (I):

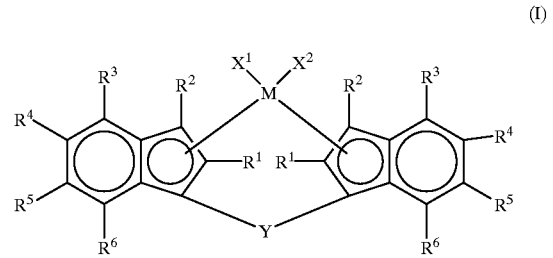

(I)

wherein M is a transition metal of Group IVB of the periodic table,
$R^1$ is a hydrocarbon group of 1 to 6 carbon atoms,
$R^2$, $R^4$, $R^5$ and $R^6$ are the same or different and are each a hydrogen atom, a halogen atom or a hydrocarbon group of 1 to 6 carbon atoms,
$R^3$ is an aryl group of 6 to 16 carbon atoms, which may be substituted with a halogen atom, a hydrocarbon group of 1 to 20 carbon atoms or an organosilyl group,
$X^1$ and $X^2$ are each a hydrogen atom, a halogen atom, a hydrocarbon group of 1 to 20 carbon atoms, an halogenated hydrocarbon group of 1 to 20 carbon atoms, an oxygen-containing group or a sulfur-containing group, and
Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O)(R$^7$)—, —BR$^7$— or —AlR$^7$— (where R$^7$ is a hydrogen atom, a halogen atom, a hydrocarbon group of 1 to 20 carbon atoms or a halogenated hydrocarbon group of 1 to 20 carbon atoms).

10. An injection molding resin composition comprising the flexible resin composition of claim 9.

11. An extrusion molding resin composition comprising the flexible resin composition of claim 9.

12. A compression molding resin composition comprising the flexible resin composition of claim 9.

13. A flexible resin molded product comprising the resin composition of claim 9.

14. A flexible resin molded product comprising the resin composition of claim 3.

15. A flexible resin molded product comprising the resin composition of claim 4.

16. A flexible resin molded product comprising the resin composition of claim 5.

17. A flexible resin molded product comprising the resin composition of claim 6.

* * * * *